A. W. Webster.
Corset Clasp.
No. 71,092. Patented Nov. 19, 1867.
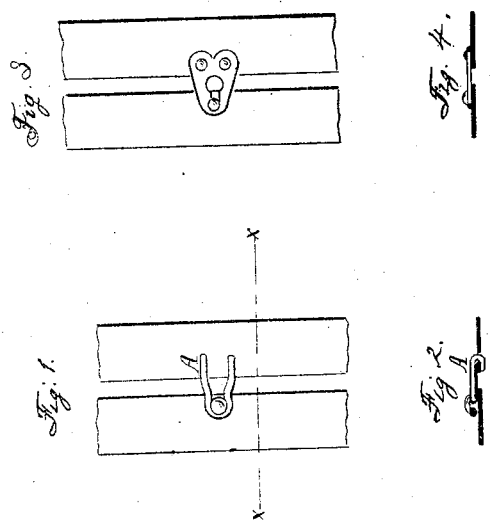
Witnesses:
Theo Tusch
J. A. Service
Inventor:
A. H. Webster
Per Munn & Co
Attorneys

United States Patent Office.

A. W. WEBSTER, OF ANSONIA, CONNECTICUT.

Letters Patent No. 71,092, dated November 19, 1867; antedated November 9, 1867.

IMPROVEMENT IN FASTENINGS FOR CORSETS.

The Schedule referred to in these Letters Patent and making part of the same.

TO ALL WHOM IT MAY CONCERN:

Be it known that I, A. W. WEBSTER, of Ansonia, in the county of New Haven, and State of Connecticut, have invented a new and useful Improvement in Corsets; and I do hereby declare that the following is a full, clear, and exact description thereof, which will enable those skilled in the art to make and use the same, reference being had to the accompanying drawings, forming part of this specification.

The present invention relates more particularly to the clasps for corsets, and it consists in making the hook portion or part of such clasps of wire, bent into the proper shape therefor, whereby rivets are dispensed with, and a stronger and more reliable, as well as a cheaper clasp produced. In the accompanying plate of drawings my improvement is illustrated—

Figure 1 being a front view of the same, as applied to the corset-springs.

Figure 2, a transverse section, taken in the plane of the line $x\ x$, fig. 1; and Figures 3 and 4, similar views to figs. 1 and 2 respectively, but of the old form of clasps.

A, in the drawings, represents my improved corset-clasp hook, which is made of wire, whether brass, steel, iron, or other suitable kind of metal, or other material, bent into the shape shown in fig. 1 of the drawings, or into any other suitable shape that will allow it to receive and hold the headed stud or pin forming the other part of the clasp, as in the ordinary clasp of corsets. By the two ends of the wire which constitute the hook A, the hook is secured to the spring-band of the corset, on which they are usually attached; these ends being passed through suitable holes in the said band, and then upset or riveted upon the under side of the same.

The above-described form of hook for the clasps of corsets is much cheaper than the ordinary form, not only in cost of manufacture, but in the expense of applying it to the corset-band, as my improved form dispenses with the use of two separate rivets.

I claim as new, and desire to secure by Letters Patent—

A corset-fastening, composed of the wire A, attached to the brusk by its own ends, substantially as described and for the purpose set forth.

A. W. WEBSTER.

Witnesses:
MARY COLBURN,
HOWARD COLBURN.